United States Patent Office 3,528,213
Patented Sept. 15, 1970

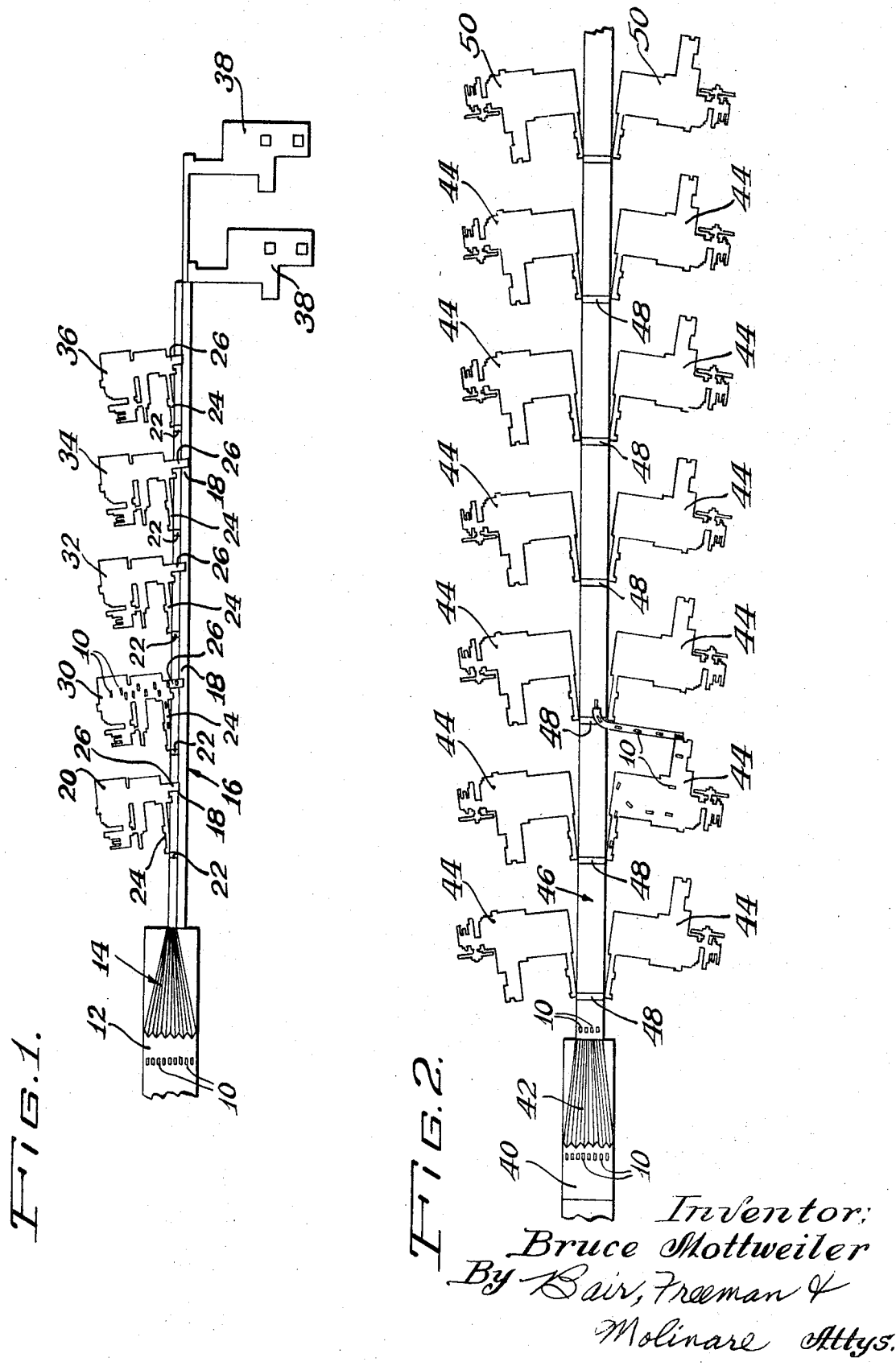

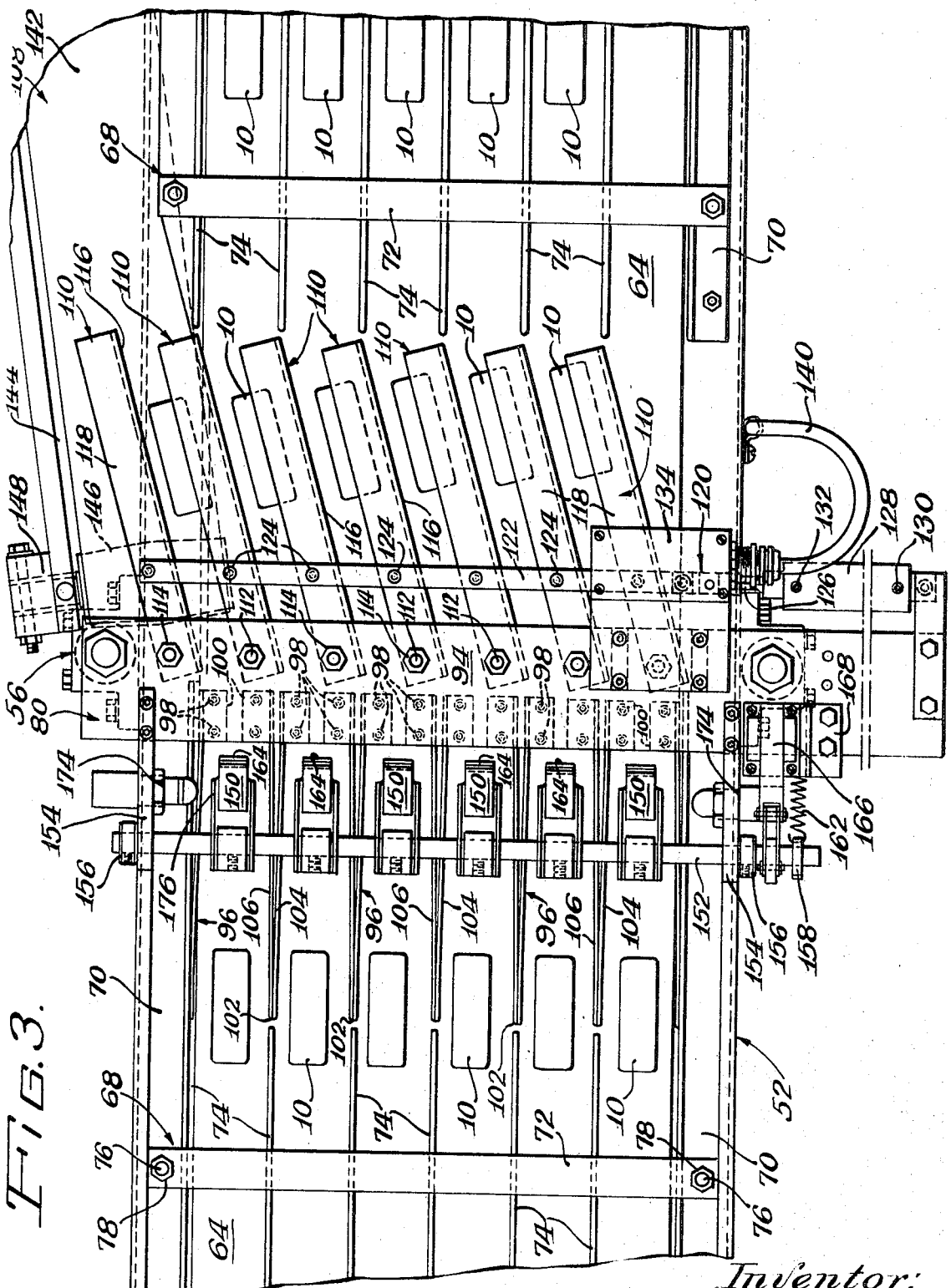

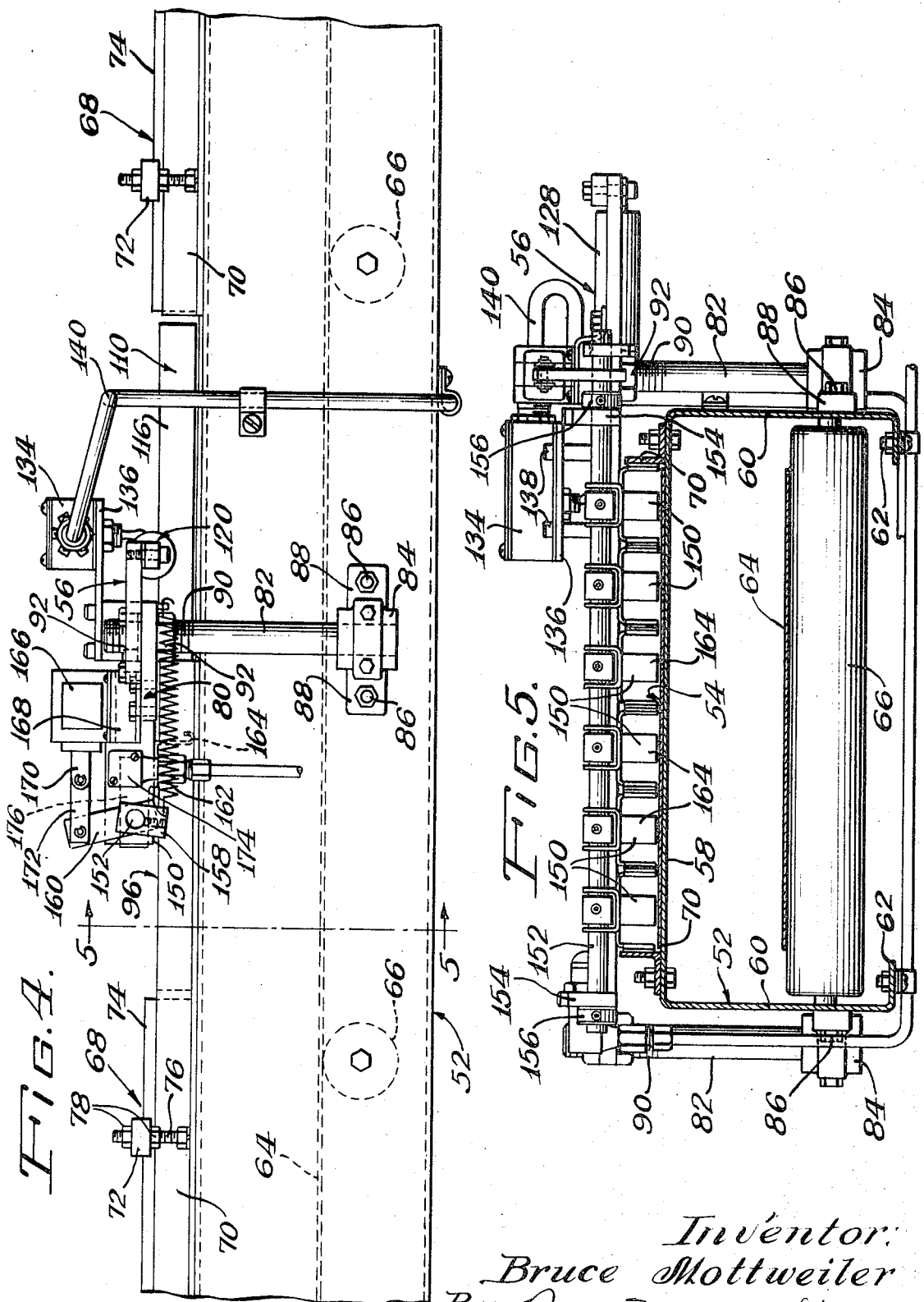

3,528,213
CONVEYING SYSTEM
Bruce Mottweiler, Alexandria, Ind., assignor to Lynch Corporation, a corporation of Indiana
Filed Sept. 27, 1967, Ser. No. 670,906
Int. Cl. B65g 47/46; B23q 7/14
U.S. Cl. 53—77          8 Claims

ABSTRACT OF THE DISCLOSURE

A method and system for conveying and processing a plurality of articles. A conveyor moves the articles in a plurality of spaced rows and a plurality of machines are provided for individually processing the articles and are positioned along a side of the conveyor. Apparatus is provided for diverting the outermost row of moving articles from the conveyor to a first machine for processing while the apparatus simultaneously diverts the other rows on the conveyor a distance of one row's spacing in a direction towards the processing machines. Subsequent diverting apparatus is provided for moving each successive outermost row of articles to each successive article processing machine.

BACKGROUND OF THE INVENTION

Field of the invention—Description of the prior art

This invention relates to an improved conveyor and processing method and system for a plurality of articles, and it particularly relates to a system for conveying a plurality of unwrapped articles to wrapping machines, wrapping the articles, and then removing the wrapped articles from the wrapping machines.

In processing each of a large number of articles in a manufacturing process, there always is a problem of efficiently, conveniently, and economically handling or conveying the individual articles to and from the particular processing apparatus. Such a problem is typically encountered in articles that require individual wrapping, such as in wrapping candy bars and the like.

In normal systems for conveying and handling candy bars, it has been the practice to first pass a large number of rows, such as twenty rows, of candy bars from the production line to a conveyor. Wrapping machines are positioned alongside the conveyor and operators manually remove the candy bars from the conveyors and then maually feed them to the wrapping machines for wrapping.

In the described wrapping system, there are significant drawbacks because of the required manual labor. This manual labor is expensive, time consuming and inefficient. Clearly, it would be highly desirable to provide a wrapping machine system wherein the conveyor and wrapping machines are coordinated into a substantially continuous system requiring no manual handling of the candy bars.

SUMMARY OF THE INVENTION

It is, therefore, an important object of this invention to provide an improved conveyor system for processing a large number of individual articles which must be individually processed wherein the system substantially avoids the disadvantage of prior art systems.

It is a further important object of this invention to provide an improved method and system for handling a large number of individual articles, such as candy bars, for processing, such as wrapping, wherein both the method and system are particularly characterized by their economy and efficiency in construction and operation.

It is also an object of this invention to provide an improved method and system for conveying a plurality of articles for individual processing wherein there is substantially no need for shutting down the system for failure or inoperativeness of a processing machine.

It is yet another object of this invention to provide an improved system and method for conveying individual articles, such as candy bars, for processing wherein a single conveyor mechanism is used in conjunction with a plurality of processing machines, such as wrapping machines.

It is still another object of this invention to provide an improved system and method for conveying a plurality of candy bars for wrapping and further processing, such as cartoning.

Further purposes and objects of this invention will appear as the specification proceeds.

Generally, my improved conveyor and processing system for a plurality of articles includes a conveyor mechanism for moving the articles in a plurality of separate spaced rows, including a first row of articles, such as the outer row on the conveyor. A plurality of machines are provided for individually processing the articles, and these machines, such as wrapping machines, are positioned next to the conveyor. Apparatus is provided for normally diverting the first row of the articles from the conveyor to one of the processing machines and simultaneously diverting the other rows in the same direction a distance equal to about the spacing between the rows. Additional diverting apparatus is positioned on the conveyor downstream of the first diverter apparatus and diverts the new first row of articles to another of the processing machines, which additional apparatus may simultaneously divert any other row of articles remaining on the conveyor in the same direction a distance of one row's spacing.

BRIEF DESCRIPTION OF THE DRAWINGS

FIG. 1 is a top plan schematic view illustrating one form of my improved conveyor and processing system for articles;

FIG. 2 is a top plan schematic view of another preferred form of my improved system for conveying and processing articles;

FIG. 3 is a detailed, top plan view of a portion of the conveyor and the apparatus provided for diverting the articles laterally;

FIG. 4 is a side elevational view of the embodiment of FIG. 3; and

FIG. 5 is a cross sectional view of the embodiment of FIGS. 3 and 4 and is taken along the line 5—5 of FIG. 4.

DESCRIPTION OF THE PREFERRED EMBODIMENT

Referring particularly to the schematic illustrations in FIGS. 1 and 2, the general operation of my method and system will be described. Referring first to the embodiment of FIG. 1, articles to be processed, generally 10, such as candy bars, are placed on a normally moving conveyor 12 of a production line for making the articles or candy bars 10. For simplicity, the articles will hereinafter be referred to as candy bars. The conveyor 12 feeds the bars 10 in a large number of rows, such as 20 or more, to a collating or feeder device 14 which reduces the number of rows of candy bars 10 down to four in number. The collator 14 thereby feeds the articles 10 in separate spaced rows to a conveyor mechanism 16. The conveyor mechanism 16 transfers the candy bars 10 to a first processing machine 20, which will hereinafter be described as a wrapping machine.

The bars 10 are moved along the conveyor 16 in aligned separate rows. Preferably, the longitudinal axis of the bars 10 is longitudinal with the axis of the conveyor 16. The row of bars 10 closest to the outer edge of conveyor 16 is diverted to the first wrapping machine 20 by a diverting mechanism, generally 22, which will be described in detail hereinafter this specification. The candy bars 10 are fed along the conveyor belt 24 to the wrapping machine 20, which wraps the candy bars 10. A take off conveyor 26 passes each of the wrapped bars 10 to a central portion 18 of the conveyor 16. The take off conveyor 26 also feeds the wrapped candy bars 10 to the conveyor in aligned rows, similar to the aligned rows of unwrapped bars on the conveyor 16. Thus, the outer rows on the conveyor may be unwrapped bars while the inner rows are wrapped.

The diverting mechanism 22, in addition in moving the row of candy bars nearest the edge of the conveyor 16 to the take off conveyor 24 of the wrapping machine 20, diverts the other three aligned rows of candy bars toward the outer edge of the conveyor 16 a distance substantially equal to the distance of the lateral spacing between adjacent rows of moving candy bars.

Another diverting means 22 downstream of the first diverter 22 directs the outermost row of bars 10 to the second wrapping machine 30. The second wrapping machine 30 also has a take off conveyor 26 for passing the wrapped candy bars 10 to the central portion 18 of the conveyor 16. A third machine 32 and a fourth machine 34 are similarly provided for wrapping the candy bars 10 in successive rows of bars. A fifth wrapping machine 36 is normally not is use and acts as a stand-by machine. In the event that any of the normally operating machines 20, 30, 32, 34 become inoperative for any reason, such as running out of wrapping material, a suitable switching arrangement (not shown) provided on the wrapping machines, causes actuation of the diverting mechanism 22 so candy bars 10 bypass the particular inoperative machine. The same switch mechanism (not shown) on the wrapping machine also effects start up of operation for standby machine 36 at the end of the conveyor line 16. It is thus seen that regardless of the breakdown in operation of one of the wrapping machines 20, the system as shown and described economically and effectively maintains the conveyor line 16 in continuous operation without any shut down in operation.

In the embodiment of FIG. 1, cartoning machines 38 are preferably positioned at the end of the conveyor line 16. The rows of wrapped candy bars pass from the conveyor 16 to one or the other of the cartoning machines 38 which automatically place a plurality of wrapped candy bars 10 into suitable cartons (not shown).

The alternate embodiment of FIG. 2 shows another form of my improved system. It is to be understood, however, that a great variety of arrangements may be made in the conveying systems without departing from the invention. The conveyor 40 feeds candy bars 10 from the production line to a collator or feeder 42 which reduces the rows from, for example, thirty-two to twelve in number. In this embodiment, wrapping machines 44 are positioned on both sides of the conveyor 46 to which candy bars 10 are fed from the collator 42.

The wrapping machines 44 are aligned in rows on opposite sides of the conveyor 46 and each pair of machines utilizes a single diverting mechanism 48 for moving the aligned rows of candy bars 10 in opposite directions to each wrapping machine 44. In the embodiment of FIG. 2, the wrapped bars are returned to a separate conveyor (not shown) above the conveyor 46.

Essentially, the diverting mechanism of FIG. 1 is the same as that of FIG. 2, except that mechanism 48 diverts candy bars to both sides of the conveyor 46, and not just to one side as in the embodiment of FIG. 1. In the embodiment of FIG. 2, seven wrapping machines 44 are positioned on each side of the conveyor 46. The last machine 50 for each row of wrapping machines 44 is the standby machine which comes into operation when one of the other wrapping machines 44 becomes inoperative for any reason.

In my system, the number of rows of articles being moved from the collator is equal to the number of operative wrapping machines; a standby machine is provided for each set of wrapping machines. Thus, in the embodiment of FIG. 1, four rows are conveyed, four wrapping machines are in use, and one machine is a standby or is being made operative; in FIG. 2, twelve rows of bars are being processed, six operating machines are on opposite sides of the conveyor, and one standby machine is on each side of the conveyor. Also, the number of diverting mechanisms is equal to the number of machines on one side of the conveyor or to the number of pairs of machines on opposite sides of the conveyor.

Two of the important structural mechanisms in my system are the collator and the divering mechanism. As to the collator, any of a variety of mechanisms useful for reducing the number of rows of articles may be used. A preferred collator structure is described in co-pending application Ser. No. 670,307, of William A. Stutske and Kenneth J. Henry, entitled "Vibratory Grouping Apparatus," filed on even date herewith.

The other important unique structure in the applicant's invention comprises the diverting mechanism for moving the candy bars laterally so that rows of the candy bars are directed to the conveyors of the wrapping machines. The structural details of a preferred form of this mechanism is shown in detail in FIGS. 3–5. This illustrated mechanism is the type useful in the first embodiment since it feeds to one side only.

Structural members (not shown) are rigidly secured to a frame, generally 52, for supporting the conveyor, generally 54, and a diverting mechanism, generally 56.

The frame 52 generally comprises sheet metal bent into a generally inverted U-shape, as shown in FIG. 5, to provide an upper wall 58, a pair of opposed side walls 60 and a pair of inwardly facing inturned lower flanges 62. The frame 52 is substantially coextensive in length with that of the conveyor 54.

A continuous conveyor belt 64 is supported by and is moved along the upper surface of the upper wall 58 at a desired speed by suitable drive means (not shown), as an electric motor or the like. The continuous belt 64 picks up bars 10 from a collator, such as 14 or 42, as shown in FIGS. 1 and 2, and moves along the upper wall 58. On its return movement, the continuous belt conveyor is moved in the space defined below the upper wall 58 and between the side walls 60, as shown most clearly in FIG. 5. In movement below the wall 58, the belt 64 is supported by a plurality of idler rollers 66 journalled at their opposite ends in a suitable manner in the side walls 60.

An overhead divider frame, generally 68, is mounted over the machine frame 52. The frame 68 includes a pair of opposed side support members 70, advantageously made of angle iron. Cross supports 72 pass between the side members 70 to provide rigid support for intermediate divider strips 74 which define spaced separated rows for the moving bars 10 on the conveyor belt 64. The underside of each cross support 72 is rigidly joined to the upper edges of each of the divider strips 74 as by welding. The cross support 72 and the strips 74 are adjustable vertically. The vertical adjustability of the cross supports and divider strips 74 is necessary in order to provide for proper spacing of the lower edges of the divider strips 74 above the moving conveyor belt 64. In order to provide the desired adjustability, threaded studs 76 are mounted in the opposite ends of cross supports 72. Locking bolts are threadably received on the studs 76 on opposite sides of the opposite ends of the cross support 72. The lower ends of the studs 76 are threadably received in the side members 70 and in the frame 52. Upon adjustment of the locking bolts 78 on the studs 76, the desired fixed vertical position of the divider strips 74 above the belt 64 is accomplished. The divider strips 74 are discontinuous at the diverting mechanism 56.

The diverting mechanism 56 includes a support frame, generally 80. The support frame 80 is adjustable in a vertical direction and is secured to the side walls 60 of the frame 52. A pair of opposed upright rods 82 are slidably received within support blocks 84 which are rigidly secured to the outer surfaces of the opposite side walls 60 of the frame 52. The support blocks 84 are secured to the frame 52 by bolt 86 passing through the opposite flanges 88 of the support blocks 84. The upright rods 82 are threaded at their upper ends, at 90. Locking nuts 92 threadedly secured to the threaded ends 90 of the rods 82 are interposed on opposite sides of an upper support plate 94, which provides support for the operating portion of the diverting mechanism 56.

Divider members 96, V-shaped in plan view, are secured to the underside of the support plate 94 by bolts 98 which are received by connecting flanges 100 of the V-shaped divider members 96. The apex 102 of each of the V-shaped dividers 96 is aligned with and closely adjacent to the leading edge of the divider strips 74 so as to provide a continuous divider between rows of moving candy bars 10. One leg 104 of each of V-shaped divider 86 extends in a substantially forward direction so as to define one side of a divider row. The second leg 106 of the V-shaped divider 96 extends diagonally in a direction towards the side of the conveyor 54 that has the wrapping machines, generally 108, positioned therealong. The diagonal mounting of the second leg 106 initially directs the moving bars 10 in the desired lateral direction. A plurality of movable diverting plates 110 are pivotally mounted to the underside of the overhead support plate 94. Pivot pins 112 are securely mounted on the support plate as by nuts 114, so that the diverting plates 110 are pivotal about a vertical axis. The diverting plates 110 include a downwardly extending guide wall 116 and a laterally extending upper flange 118. The upper flange 118 on the diverting members 110 assures that the articles 10 will be moved in proper alignment during the diverting movement.

Upon a proper signal from an inoperative wrapping machine, the diverting members 110 are pivoted about their vertical axis by the pivoting mechanism, generally 120. The pivoting mechanism includes a drive bar 122 pivotally secured to the upper flanges 118 of each of the diverting members 110 by suitable nuts 124. The drive bar 122 is secured to the upper flanges 118 at a point intermediate each pivot point for the diverting plates 110 and the outer end of each plate. One end of the drive bar 122 is coupled in a suitable manner to the outer end of a piston rod 126 of an air operated cylinder 128. The air cylinder 128 has a constant supply of relatively low pressure air on one side of a piston (not shown) cylinder 128 also includes a high pressure air intlet 132 through a low pressure inlet port 130. This constant supply of air pressure normally maintains the diverting plates 110 in the diagonal position shown in FIG. 3. The air cylinder 128 also includes a high pressure air inlet 132 which, at the proper conditions, directs high pressure air to the opposite side of the piston within the air cylinder so as to drive the piston rod 126 and thereby the drive bar 122 in a direction so as to pivot the diverting plates 110 into a straight ahead position and thereby cause the candy bars 10 to bypass the inoperative machine.

The high pressure air is supplied to the air cylinder 128 through a solenoid operated valve 134 which is mounted upon a plate 136 secured in place by bolts 138. An air inlet hose 140 is connected to a source of relatively high pressure air and directs air into the solenoid operated valve 134. At the proper conditions, the solenoid operated valve 134 directs air through a hose (not shown) connected to the high pressure inlet 132. Conversely, when it is desired that the diverting members be moved to the normal diagonal position, as shown in FIG. 3, the solenoid valve 134 stops the flow of high pressure air to the air cylinder 128, and simultaneously, the air pressure on the high pressure side of the air cylinder 128 is relieved through suitable porting so that the low pressure side of the air cylinder causes the desired return movement of the piston rod 126 and the drive bar 122.

The moving ends of the diverting members 110 have the outer edges of the downwardly extending walls 116 in substantial alignment with and adjacent the trailing edge of a set of the forward set divider strips 74 in either relative pivoted position. In this way, the candy bars 10 are guided by the diverting members 110 in a continuous path of travel both while in and out of the diverting position. The rearward divider strips 74, the V-shaped divider members 96, the diverting plates 110, and the forward set of divider strips 74 form a continuous path of divided spacing between rows of moving bars.

The first row of articles 10, that is, the row closest to the wrapping mechanism 108, is fed to an inlet belt conveyor belt 64 so that the bars 10 are directed from The belt conveyor 142 intercepts the outer edge of the conevyor belt 64 so that the bars 10 are directed from the belt 64 to the belt 142 in a single file row. The conveyor belt 142 has a guide plate 14 4and moves the candy bars 10 to the wrapping mechanism 108. An idler roller 146 for guiding the belt is journalled to a support plate 44 by a journal member 148. Thus, as the diverting plates define a path of travel towards the conveyor belt 142, a single file row of bars 10 is directed from the moving belt 64 to the wrapping machine belt 142.

In order to avoid damage to the candy bars 10 as the diverting mechanism is moved laterally in either direction, such as may occur if a candy bar is caught in the space between the diverting member 110 and a divider strip 74 or a V-shaped divider 96, a plurality of blocking members 150 are provided. The blocking members 150, which are provided to intercept the movement of the articles in each row, are each rigidly secured at one end to a horizontal bar 152. The bar 152 is secured to the support plate 94 by a pair of rearwardly extending support bars 154. The rod or bar 152 is pivotally carried in a suitable manner by the bars 154 so that the blocking members 150 are pivotable about a horizontal axis in and out of a blocking position between the divider strips 74. A pair of collars 156 are secured to the opposite ends of the bar 152 adjacent the outer edges of the support bars 154 so that the rod 152 is securely pivotally mounted in place. One outermost end of the rod 152 rigidly carries a spring support plate 158. A link 160 is rigidly secured to the rod 152 at a point intermediate one collar 156 and a spring support plate 158. The spring support plate 158 engages one end of a tension spring 162 whose other end engages the support plate 94. The tension spring 162, as viewed in FIG. 4, normally pivots the blocking members 150 about the axis of the rod 152 in a counterclockwise direction so that the downwardly extending blocking portions 164 of the blocking members 150 are normally raised out of the path of travel of the moving articles 10.

In order to pivot the blocking portions 164 into the path of travel to thereby effect the blocking of the articles 10, an electromagnet 166 is provided. The electromagnet 166 is mounted upon a plate 168 which in turn is carried by the support plate 94. The electromagnet 166 includes an outwardly extending armature 170 which is pivotally secured to an intermediate link 172. The link 172 in turn is pivotally secured to the link 160 which is secured to the rod 152. At the proper signal, the armature 170 is drawn by magnetic force in a direction towards the main portion of electromagnet 166 so as to pivot the blocking members 150 downwardly and thereby block the path of travel of the articles 10.

Although it is believed that the manner of operation of the described apparatus may be understood from the above description, a brief description of the mechanism will be provided in order to provide a more clear description of operation.

As shown in FIG. 3, the mechanism is in its normal operating position directing articles 10 to the conveyor belt 142 for the wrapping machine 108. The articles move in spaced rows separated by suitable dividers 74. If for any reason the wrapping machine 108 becomes inoperative because of lack of paper or the like, an electrical signal from the wrapping machine, through a switching mechanism, simultaneously effects start-up operation for a standby wrapping machine and causes pivoting of the diverting members 110 to move them to a straight ahead position. A time delay switch (not shown) is used to actuate the solenoid valve so as to give sufficient time for articles to clear each diverting mechanism. The signal transmitted from the wrapping machine further generates a signal to the electromagnet 166 to rotate the rod 152 and thereby the blocking members 150 downwardly so that the blocking portions 164 block the path of travel of the leading articles or candy bars 10 in each moving row on the conveyor belt 54.

The diverting mechanism does not move until (1) the time delay switch is closed and (2) the path between a pair of photoelectric cells 174 is clear. The beam from the photoelectric cells 174 is normally blocked by the upright walls 176 of the blocking members 150. When the path is cleared, the beam between the cells 174 is completed, which condition in turn completes a circuit to permit high pressure air to be directed from the solenoid operated air valve 134 to the high pressure inlet 132 of the air cylinder 128. This high pressure air overcomes the relatively low pressure air in the air cylinder 128 and causes the diverting members 110 to pivot into a straight ahead position. Candy bars bypass the inoperative wrapping machine. The standby machine then takes over for the inoperative machine. A time delay switch (not shown) subsequently breaks the circuit to the electromagnet 166 to thereby raise the blocking members 150 and permit continued flow of the candy bars on a straight ahead path of travel.

When it is desired to place the inoperative wrapping machine back into operation, a similar signal may be generated to first block the path of travel of the candy bars 10 by the blocking members 150. The valve 134 stops the flow of high pressure air to the cylinder and the air pressure is automatically relieved in the cylinder 128. This action drives the diverting members 110 back to the normal position shown in FIG. 3. The blocking members are pivoted upwardly and the candy bars may move in the normal diverted path of travel.

While in the foregoing there has been provided a detailed description of particular embodiments of the present invention, it is to be understood that all equivalents obvious to those having skill in the art are to be included within the scope of the invention as claimed.

What I claim and desire to secure by Letters Patent is:

1. A conveyor and processing system for a plurality of articles, said system comprising conveyor means for moving said articles in a plurality of spaced rows including a first row of articles, a plurality of means for individually processing said articles and being positioned along said conveyor means, first means for normally diverting said first row of articles from said conveyor means to one of said article processing means and for simultaneously diverting at least one other of said spaced rows a distance of the spacing between rows in a direction toward said processing means, subsequent diverting means for diverting at least said other row of articles to another of said article processing means, means on said processing means for carrying processed articles back to said conveyor means, and means responsive to said article processing means becoming inoperative for selectively moving said diverting means from the normal diverting position to a straight ahead position, so as to cause said articles to bypass said inoperative processing means.

2. The system of claim 1 wherein dividers are mounted over said conveyor for separating said rows of articles during movement along said conveyor means.

3. The system of claim 1 wherein said conveyor means includes a first conveyor for moving said articles in rows greater in number than in said plurality of spaced rows, means for reducing the number of rows of said articles from said greater number to said plurality of rows, and a second conveyor for receiving said plurality of rows of articles from said reducing means and for moving said articles past said processing means.

4. The system of claim 1 wherein said conveyor means is divided into a first portion and a second portion, said first portion being for movement of unprocessed articles to said processing means, and said second portion being for movement of processed articles away from said processing means.

5. The apparatus of claim 4 wherein said processing machines are wrapping machines and are all positioned on the same side of said conveyor means, said first portion of the conveyor means is positioned adjacent said processing machines and said second portion is spaced from said processing means.

6. The system of claim 1 wherein there is at least one more processing means than rows of articles so that the articles bypassing said inoperative processing means are subsequently diverted by one of said diverting means to said one more processing means.

7. The system of claim 1 wherein said articles are candy bars and said processing means are machines for individually wrapping said candy bars, and apparatus is positioned at the end of said conveyor means for placing said wrapped candy bars within cartons.

8. A conveyor and processing system for a plurality of articles, said system comprising conveyor means for moving said articles in a plurality of spaced rows including a first row of articles, a plurality of means for individually processing said articles and being positioned along said conveyor means, first means for normally diverting said first row of articles from said conveyor means to one of said article processing means and for simultaneously diverting at least one other of said spaced rows a distance of the spacing between rows in a direction toward said processing means, subsequent diverting means for diverting at least said other row of articles to another of said article processing means, means responsive to said article processing means becoming inoperative for selectively moving said diverting means from the normal diverting position to a straight ahead position, so as to cause said articles to bypass said inoperative processing means, means for blocking the leading articles in said rows until said diverting means have completed the movement from the diverted position so as to avoid damaging said articles upon the movement of said diverting means, and means for moving the blocking means out of the blocking position to permit the resumed movement of said articles.

References Cited

UNITED STATES PATENTS

| | | | |
|---|---|---|---|
| 2,586,988 | 2/1952 | Page | 198—42 |
| 2,886,164 | 5/1959 | Solecki | 198—19 |
| 3,268,094 | 8/1966 | Fischer et al. | 198—19 X |
| 3,292,341 | 12/1966 | Frost | 53—61 |

THERON E. CONDON, Primary Examiner

N. ABRAMS, Assistant Examiner

U.S. Cl. X.R.

53—203; 198—19, 42